(12) United States Patent
Walton

(10) Patent No.: US 7,152,759 B2
(45) Date of Patent: Dec. 26, 2006

(54) BOTTLED LIQUID DISPENSERS

(75) Inventor: Philip Andrew Walton, Bishop Auckland (GB)

(73) Assignee: Ebac Limited (GB)

(*) Notice: Subject to any disclaimer, the term of this patent is extended or adjusted under 35 U.S.C. 154(b) by 70 days.

(21) Appl. No.: 10/498,753

(22) PCT Filed: Dec. 11, 2002

(86) PCT No.: PCT/GB02/05623

§ 371 (c)(1),
(2), (4) Date: Jun. 15, 2004

(87) PCT Pub. No.: WO03/051780

PCT Pub. Date: Jun. 26, 2003

(65) Prior Publication Data

US 2005/0029300 A1    Feb. 10, 2005

(30) Foreign Application Priority Data

Dec. 17, 2001  (GB) .................... 0130163.9

(51) Int. Cl.
*B67D 5/58* (2006.01)
*B67D 5/62* (2006.01)

(52) U.S. Cl. .................... 222/146.6; 222/185.1; 222/190

(58) Field of Classification Search ............. 222/146.1, 222/146.6, 185.1, 190
See application file for complete search history.

(56) References Cited

U.S. PATENT DOCUMENTS

| 5,139,666 A | * | 8/1992 | Charbonneau et al. | 210/264 |
| 5,531,908 A | * | 7/1996 | Matsumoto et al. | 210/760 |
| 5,744,028 A | * | 4/1998 | Goto et al. | 210/181 |
| 5,868,944 A | * | 2/1999 | Wright et al. | 210/758 |
| 6,101,835 A | * | 8/2000 | Butsch et al. | 62/390 |

FOREIGN PATENT DOCUMENTS

| EP | 0581491 | 2/1994 |
| FR | 2685293 | 6/1993 |
| GB | 1552559 | 4/1977 |
| WO | WO9426622 | 11/1994 |

* cited by examiner

*Primary Examiner*—Joseph A. Kaufman
(74) *Attorney, Agent, or Firm*—Ira S. Dorman

(57) ABSTRACT

Bottled water or other liquid is supplied via a bottle connector 5 for releasable sealing engagement with a neck formed on the bottle, and a transfer tube 6 to a reservoir 7 wherein the water may be cooled. The bottle connector 5, the transfer tube 6 and the reservoir 7 are all moulded of a plastics material containing silver bound in a ceramic ion exchange resin so that the silver ions (Ag+) are slowly released to prevent microbial growth on the surface of the components. The bottle connector may include a feed tube 21 or a dip tube which also releases silver ions. Furthermore, the transfer tube 6 may be connected to the reservoir 7 via a reservoir connector 29 which may incorporate a draw tube 31 and one or more outlet tubes 14, 36, e.g. leading to a discharge outlet, all of which release silver ions.

20 Claims, 2 Drawing Sheets

BOTTLED LIQUID DISPENSERS

TECHNICAL FIELD OF THE INVENTION

This invention relates to bottled liquid dispensers of the kind in which a liquid (usually water) is supplied from a bottle to a discharge outlet via a reservoir. Generally (but not always) the liquid is heated or cooled in the reservoir.

BACKGROUND

Over the years a great deal of attention has been paid to improving the hygiene in bottled liquid dispensers, more particularly to prevent the multiplication of any bacteria which could cause health problems.

In the past the reservoir and its associated components were fixed in the dispenser and it was necessary to sanitize them in situ during periodic routine maintenance.

FR 2 685 293 A1 proposes to separate the liquid from any air which enters the bottle by sealing the liquid within a separate collapsable bag. However, a more common approach to reducing the risk of contamination with air-bourne pathogens is to filter the air before it enters the bottle.

Another sanitizing measure proposed in GB 1 552 559 is to place a porous ceramic body between the bottle and the reservoir. The ceramic body contains metallic silver which it is claimed will disinfect the water as it flows into the reservoir. However, it is doubtful whether such brief contact would achieve effective and lasting sanitization.

The most effective solution to date which is the subject of EP 0 581 491 A (Ebac Limited) is to provide a disposable reservoir in combination with a feed tube unit which is releasably supported beneath the bottle for connection therewith so that the feed tube unit, reservoir and interconnecting pipework (known as a Watertrail* assembly) can be periodically removed and replaced with clean components. Although this system is very reliable at minimising the risk of bacterial growth if the Watertrail* assembly is changed at the recommended intervals there is a constant desire to improve the level of hygiene.

The present invention seeks to provide a new and inventive form of liquid dispensing apparatus which provides an even greater increase in hygiene compared with existing apparatus.

SUMMARY OF THE INVENTION

The present invention proposes a bottled liquid dispenser in which liquid is supplied from a bottle to a discharge outlet via a reservoir, wherein the dispenser includes a bottle connector for releasable sealing engagement with a neck formed on the bottle and conduit means for conducting liquid from the bottle connector to the reservoir, in which at least the bottle connector, the conduit means and the reservoir are formed of or lined with a material containing silver in a bound form which releases silver ions ($Ag^+$) into the liquid from the surface of the material at a controlled rate.

Silver ions have a known antimicrobial action which is effective against most bacteria, yeasts, fungi and similar microbes. They bind non-specifically to the cell membrane and disrupt normal membrane function. They also pass through cell wall by a variety of mechanisms including active transport systems which normally move essential ions into the cell. Once inside the cell they readily combine with electron donor groups containing sulphur, oxygen and nitrogen as well as negatively charged groups such as phosphates and chlorides. Silver ions also combine with thiol (—SH) groups commonly found in enzymes, causing them to become denatured due to critical conformational changes in the enzyme molecule. As a result, normal cellular processes are disrupted and the cell quickly becomes poisoned and dies.

By distributing the release of silver ions material over the internal surfaces of the main components which come into direct contact with the liquid any microbes are attacked at the solid-liquid interface where they are most likely to lodge and multiply. On the other hand, the levels which are released are insufficient to cause a risk to the health of higher animals since the ions are greatly diluted when they enter the body of the liquid, and they are also inactivated by non-specific binding with proteins, salts and other substances long before they enter the animal body.

The material which releases silver ions is preferably an ion exchange resin which slowly releases silver ions to be replaced by monovalent cations from the liquid. Most liquids will contain such cations in the form of sodium ($Na^+$), potassium ($K^+$), hydrogen ($H^+$) etc.

A preferred form of ion exchange resin is a zirconium phosphate-based ceramic which, among other attributes, has high temperature stability and low colour formation. The resin may thus conveniently be added to plastic moulding materials (masterbatch) in a particulate form prior to moulding of the components, generally in a proportion of no more than 2% by weight.

The conduit means is preferably a transfer tube which connects the bottle connector to a separate reservoir.

The reservoir may be provided with thermal means for controlling the temperature of liquid in the reservoir, either by heating or cooling the liquid.

The bottle connector may take various forms and may incorporate a feed tube arranged to project into the neck of the bottle which is supported with the neck downwards or a dip tube which projects down into a bottle which is supported with its neck upwards. Such a feed tube or dip tube are preferably formed of or coated with the material which releases silver ions.

The apparatus may further include at least one outlet tube for conducting liquid from the reservoir to the discharge outlet, in which case the or each outlet tube is preferably formed of or lined with the material which releases silver ions.

The transfer tube and the or each outlet tube is preferably connected with the reservoir via a reservoir connector, and this too is preferably formed of or lined with the material which releases silver ions. The reservoir connector may incorporate a draw tube which projects into the reservoir for removing liquid therefrom, in which case the draw tube is preferably formed of or coated with the material which releases silver ions.

BRIEF DESCRIPTION OF THE DRAWINGS

The following description and the accompanying drawings referred to therein are included by way of non-limiting example in order to illustrate how the invention may be put into practice. In the drawings.

DETAILED DESCRIPTION OF THE DRAWINGS

Figure 1:
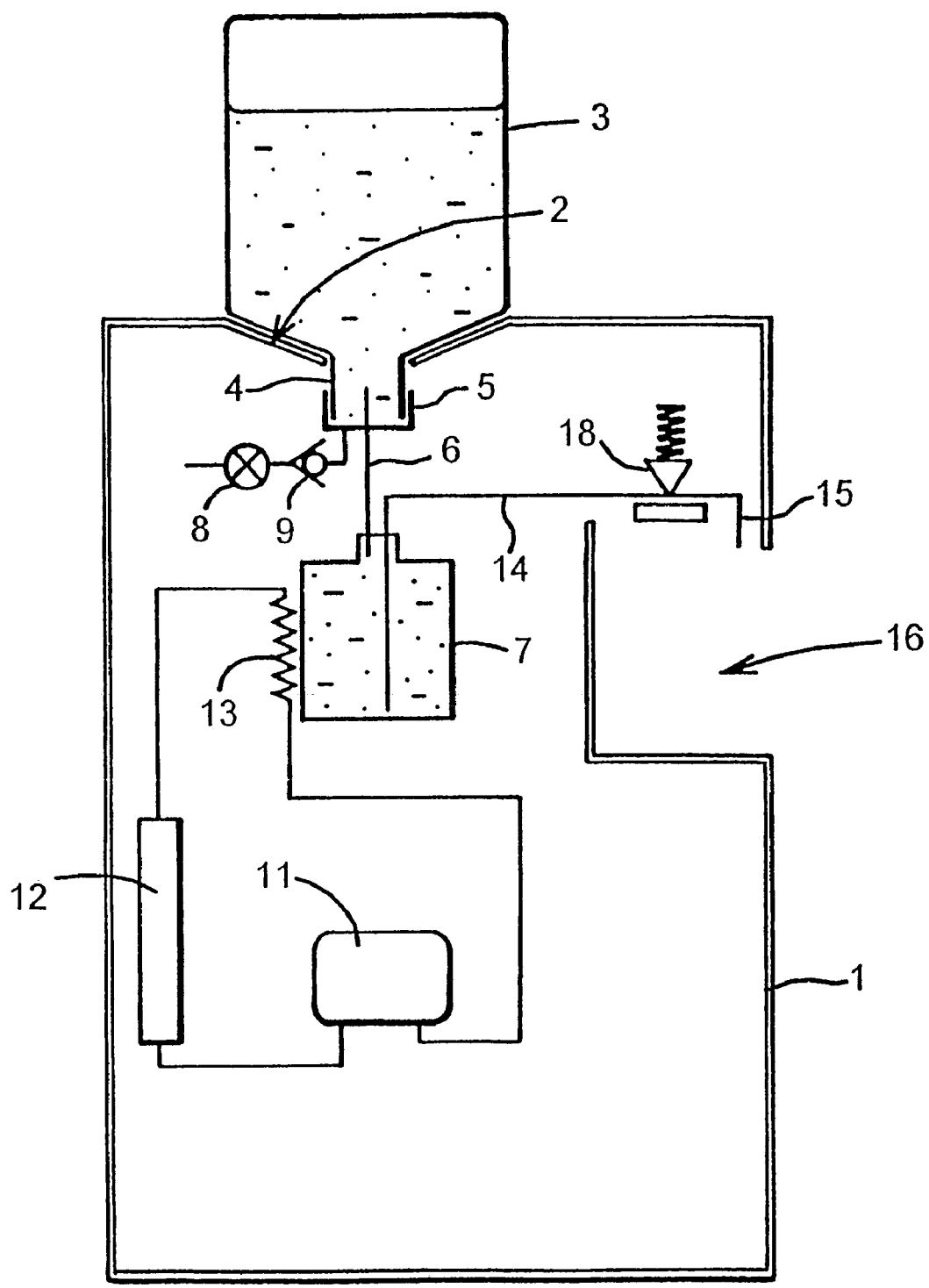
FIG. 1 is a schematic drawing showing the main components of a water cooler in accordance with the invention.

Referring to FIG. 1, the illustrated water cooler includes a housing 1 which is provided with a seat 2 for receiving a water bottle 3 which is mounted in an inverted position with its neck 4 inserted through an aperture in the seat 2. The neck is sealably engaged with a bottle connector 5 which is removably mounted within the housing 1, and from which a transfer tube 6 conducts water from the bottle to a reservoir 7, also removably mounted within the housing. Water displaced from the bottle is replaced by air which enters the bottle connector 5 via a microfilter 8 and a non-return valve 9. Water contained within the reservoir 7 may be cooled by a refrigeration system which includes a compressor 11, an air-cooled condenser 12 and an evaporator 13 which is mounted in close thermal contact with the reservoir 7. Chilled water is removed from the reservoir 7 via an outlet tube 14 which terminates in a discharge outlet 15 disposed above a dispensing recess 16 formed in the housing 1, flow control being achieved by means of a pinch valve 18 which may be as disclosed in patent specification No. EP 0 581 492 (Ebac Limited).

It will be appreciated that although the water is normally cooled in the reservoir 7, an outlet could be provided for dispensing water at ambient temperature. Furthermore, water could be supplied to a hot tank to be heated an dispensed above ambient temperature, for use in hot beverages for example.

Figure 2:
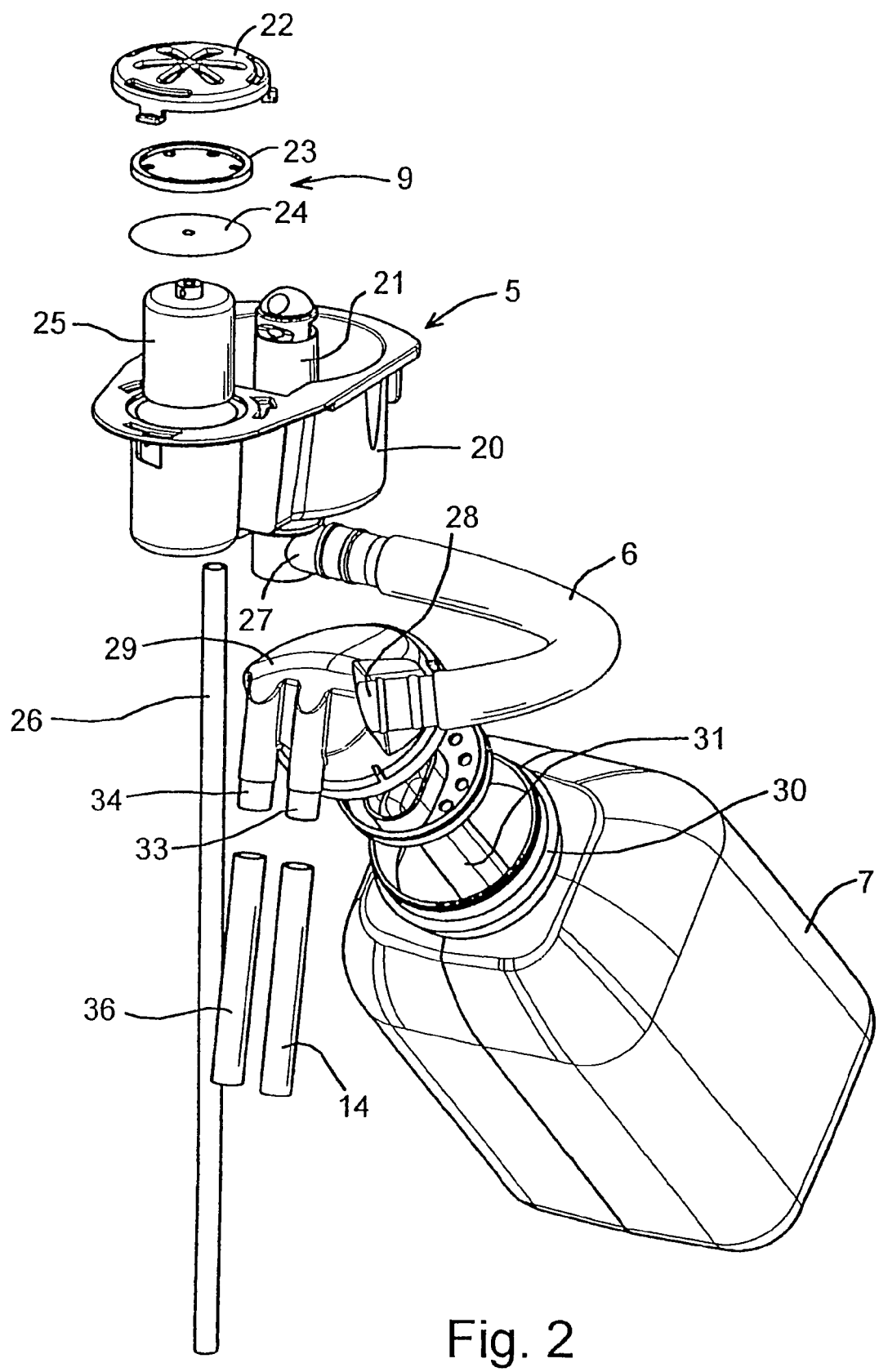
FIG. 2 is a general view of various components which are incorporated in the water cooler.

The bottle connector 5, reservoir 7 and tubes 6 and 14 are included in a replaceable Watertrail* assembly which is broadly as described in EP 0 581 491 A (Ebac Limited), and which is shown in more detail in FIG. 2. The connector 5 includes a cup-like manifold body 20, moulded of ABS, which incorporates a feed tube 21 which projects upwardly into the neck of the bottle. The manifold body also incorporates additional components such as the air filter 8 and a one way valve 9, which includes the cap 22, valve seat member 23, silicone valve disc 24 and float 25. Any water leakages are conducted to waste by a drain tube 26. The transfer tube 6, which is moulded of LDPE, connects with a spigot 27 on the bottle connector 5 to conduct water from the feed tube 21 to an inlet spigot 28 formed on a reservoir cap 29 moulded of HDPE. The cap engages with a cylindrical collar 30 formed on the reservoir 7, formed of blown HDPE, which may be received in a heat-insulated receptacle (not shown) incorporating the evaporator 13 (not shown). The cap 29 includes a draw tube unit 31, also of HDPE, through which chilled water can be removed from the lower part of the reservoir 7. The outlet tube 14 is formed of silicone rubber and engages a reservoir outlet spigot 33 formed on the cap 29. A further outlet spigot 34 may be provided on the cap 29 in known manner to conduct water to a hot tank and/or ambient water outlet (not shown) via an ambient outlet tube 36, also of silicone rubber.

In accordance with the invention, the manifold body 20, transfer tube 6, the reservoir cap 29, draw tube unit 31, reservoir 7 and outlet tubes 14 and 36 all incorporate an antimicrobial agent in the form of a particulate zirconium phosphate based ceramic ion exchange resin containing bound silver. A suitable additive is commercially available from Milliken Chemical under the trade name AlphaSan RC 5000. The agent is mixed with the moulding composition in a proportion of up to 2% by weight prior to moulding of the components. When the Watertrail* assembly is in use the resin releases silver ions into the interface between the plastics substratum and the water contained in the assembly at a steady controlled rate. As a result, tests show that the Watertrail* assembly of the invention is capable of inhibiting bacterial growth within the treated components for a considerable time, well in excess of the normal period recommended for replacement of the Watertrail* assembly. Although the antimicrobial agent only acts at the component-water interface it will be appreciated that since surface multiplication of bacterial, fungi and yeasts is prevented the whole system is effectively sanitized as long as the ion exchange resin remains active. In normal use of the dispenser and microbes present in the main volume of liquid are carried through the apparatus before they multiply to a significant level.

*Watertrail is a registered trade mark of Ebac Limited.

Clearly the components which do not come into contact with water which may be ingested need not be treated with the antimicrobial agent. Therefore, the components of the valve assembly 9 and the drain tube 26 can be of normal untreated plastics. It will further be apparent that since only the surfaces of the components which come into contact with the water need be treated it would be possible to coat such surfaces of the relevant components with a material containing the ion exchange resin.

It should also be noted that although the general form of water cooler described herein is widely used the invention is not limited to such water coolers. For example, the bottle could be mounted with its neck uppermost, in which case the bottle connector would incorporate a dip tube for removing water from the lower part of the bottle. Water may be displaced by pressurising the air space within the bottle, as described in EP 1 118 582 A2 of Ebac Limited for example.

It will be appreciated that the features disclosed herein may be present in any feasible combination. Whilst the above description lays emphasis on those areas which, in combination, are believed to be new, protection is claimed for any inventive combination of the features disclosed herein.

The invention claimed is:

1. A bottled liquid dispenser in which liquid is supplied from a bottle to a discharge outlet via a reservoir, wherein the dispenser includes a reservoir; a bottle connector for releasable sealing engagement with the open end of a neck formed on the bottle, and in liquid flow-conducting communication therewith; and conduit means connected to said bottle connector for conducting liquid from the bottle connector to the reservoir, characterised in that at least the bottle connector, the conduit means and the reservoir are formed of or lined with a material containing silver in a bound form to provide integral surfaces from which silver ions (Ag+) are released into the liquid during contact therewith and at a controlled rate.

2. A bottled liquid dispenser according to claim 1, in which the material which releases the silver ions includes an ion exchange resin.

3. A bottled liquid dispenser according to claim 2, in which the ion exchange resin is a ceramic.

4. A bottled liquid dispenser according to claim 3, in which the ion exchange resin is a zirconium phosphate based ceramic.

5. A bottled liquid dispenser according to claim 2, in which particles of the ion exchange resin are dispersed in a moulded plastics substrate.

6. A bottled liquid dispenser according to claim 5, in which the proportion of ion exchange resin in the plastics substrate is less than 2% by weight.

7. A bottled liquid dispenser according to claim 1, in which the bottle connector incorporates a feed tube or a dip tube which is arranged to project into the neck of the bottle and which is formed of or coated with the material which releases silver ions.

8. A bottled liquid dispenser according to claim 1, including at least one outlet tube for conducting liquid from the reservoir to the discharge outlet and the or each outlet tube is formed of or lined with the material which releases silver ions.

9. A bottled liquid dispenser according to claim 8, in which the conduit means and the or each outlet tube is connected with the reservoir via a reservoir connector which is formed of or lined with the material which releases silver ions.

10. A bottled liquid dispenser according to claim 9, in which the reservoir connector incorporates a draw tube which projects into the reservoir for removing liquid therefrom and the draw tube is formed of or coated with the material which releases silver ions.

11. A bottled liquid dispenser in which liquid is supplied from a bottle to a discharge outlet via a reservoir, wherein the dispenser includes a reservoir and transfer means defining a liquid flow path and constructed for conducting liquid from the bottle to the reservoir, said transfer means including a bottle connector for releasable sealing engagement with the open end of a neck formed on the bottle and in liquid flow-conducting communication therewith; characterised in that at least the transfer means and the reservoir are formed of or lined with a material containing silver in a bound form to provide integral surfaces from which silver ions (Ag+) are released into the liquid during contact therewith and at a controlled rate.

12. A bottled liquid dispenser according to claim 11, in which the material which releases the silver ions includes an ion exchange resin.

13. A bottled liquid dispenser according to claim 12, in which the ion exchange resin is a ceramic.

14. A bottled liquid dispenser according to claim 13, in which the ion exchange resin is a zirconium phosphate based ceramic.

15. A bottled liquid dispenser according to claim 12, in which particles of the ion exchange resin are dispersed in a moulded plastics substrate.

16. A bottled liquid dispenser according to claim 15, in which the proportion of ion exchange resin in the plastics substrate is less than 2% by weight.

17. A bottled liquid dispenser according to claim 11, in which the bottle connector incorporates a feed tube or a dip tube which is arranged to project into the neck of the bottle and which is formed of or coated with the material which releases silver ions.

18. A bottled liquid dispenser according to claim 11, including at least one outlet tube for conducting liquid from the reservoir to the discharge outlet and the or each outlet tube is formed of or lined with the material which releases silver ions.

19. A bottled liquid dispenser according to claim 18, in which the transfer means includes a reservoir connector to which the or each outlet tube is connected.

20. A bottled liquid dispenser according to claim 19, in which the reservoir connector incorporates a draw tube which projects into the reservoir for removing liquid therefrom and the draw tube is formed of or coated with the material which releases silver ions.

* * * * *